United States Patent
Herz et al.

(10) Patent No.: US 8,203,563 B2
(45) Date of Patent: Jun. 19, 2012

(54) SYSTEM, METHOD, AND COMPUTER PROGRAM PRODUCT FOR ADJUSTING A PROGRAMMABLE GRAPHICS/AUDIO PROCESSOR BASED ON INPUT AND OUTPUT PARAMETERS

(75) Inventors: William Samuel Herz, Hayward, CA (US); Andrew C. Fear, Cedar Park, TX (US)

(73) Assignee: NVIDIA Corporation, Santa Clara, CA (US)

( * ) Notice: Subject to any disclaimer, the term of this patent is extended or adjusted under 35 U.S.C. 154(b) by 684 days.

(21) Appl. No.: 11/454,546

(22) Filed: Jun. 16, 2006

(65) Prior Publication Data

US 2007/0291038 A1   Dec. 20, 2007

(51) Int. Cl.
*G06T 1/00* (2006.01)
(52) U.S. Cl. ........ 345/503; 345/519; 345/598; 345/629; 345/211; 345/213
(58) Field of Classification Search .......... 345/211–213, 345/503, 519, 698, 629
See application file for complete search history.

(56) References Cited

U.S. PATENT DOCUMENTS

| | | | | |
|---|---|---|---|---|
| 4,899,216 A | * | 2/1990 | Tatsumi et al. | 358/521 |
| 5,606,348 A | * | 2/1997 | Chiu | 345/213 |
| 6,801,811 B2 | * | 10/2004 | Ranganathan et al. | 700/22 |
| 6,970,146 B1 | * | 11/2005 | Jun | 345/3.1 |
| 7,009,616 B2 | * | 3/2006 | Mendelson et al. | 345/519 |
| 7,471,336 B2 | * | 12/2008 | Corral Soto | 348/452 |
| 2003/0201990 A1 | * | 10/2003 | Aldrich et al. | 345/211 |
| 2003/0222870 A1 | * | 12/2003 | Driemeyer et al. | 345/426 |
| 2004/0128126 A1 | | 7/2004 | Nam et al. | |
| 2004/0150650 A1 | | 8/2004 | Mendelson et al. | |
| 2004/0212610 A1 | * | 10/2004 | Hamlin | 345/211 |
| 2005/0104899 A1 | * | 5/2005 | Swartz et al. | 345/629 |
| 2005/0134735 A1 | * | 6/2005 | Swartz | 348/554 |
| 2006/0012604 A1 | | 1/2006 | Seetharamaiah et al. | |
| 2006/0017751 A1 | * | 1/2006 | Shintani et al. | 345/698 |
| 2006/0250385 A1 | * | 11/2006 | Plut | 345/211 |

FOREIGN PATENT DOCUMENTS

KR    20020067763 A    8/2002

OTHER PUBLICATIONS

Chinese Office Action from Application No. 200710111958.8 mailed on Apr. 24, 2009.
Office Action from Chinese Patent Application No. 200710111958.8, dated Sep. 9, 2011.
Notification of Allowance from Taiwan Patent Application No. 10120025470, dated Jan. 10, 2012.
Office Action from Taiwan Patent Application No. 09612580, dated Apr. 28, 2011.
Notice of Preliminary Rejection from Korean Patent Application No. 10-2007-59144, dated Apr. 29, 2009 (translation only).

* cited by examiner

*Primary Examiner* — Jin-Cheng Wang
(74) *Attorney, Agent, or Firm* — Zilka-Kotab, PC (57) ABSTRACT

A system, method, and computer program product are provided for adjusting at least one aspect of a programmable graphics and/or audio processor. In use, at least one input parameter and at least one output parameter of a programmable graphics and/or audio processor are identified. Thereafter, at least one aspect of the programmable graphics and/or audio processor may thus be dynamically adjusted. Such adjustment is performed as a function of both the at least one input parameter and the at least one output parameter.

25 Claims, 6 Drawing Sheets

SYSTEM, METHOD, AND COMPUTER PROGRAM PRODUCT FOR ADJUSTING A PROGRAMMABLE GRAPHICS/AUDIO PROCESSOR BASED ON INPUT AND OUTPUT PARAMETERS

FIELD OF THE INVENTION

The present invention relates to programmable architectures, and more particularly to adjusting programmable graphics/audio processors based on various parameters.

BACKGROUND

Processors, in general, have become more and more adjustable in nature. Graphics processors are one example of processors which have exhibited this trend. Such adjustability has primarily been driven by an increase in the programmability of various aspects of such processors. Just by way of example, graphics processors are equipped with various programmable shaders which are capable of adjusting graphics processing based on various factors such as particulars of a specific application, physical attributes of an output device, etc.

For example, graphics processors currently query information regarding an output device (e.g. a display, etc.) for tailoring processing for such device. Such information is typically provided by extended display identification data (EDID) which is defined by the video electronics standards association (VESA). Such EDID typically includes basic information about an output display and its capabilities, including vendor information, maximum image size, color characteristics, factory pre-set timings, frequency range limits, character strings for the output display name, serial number, etc.

Figure 1:
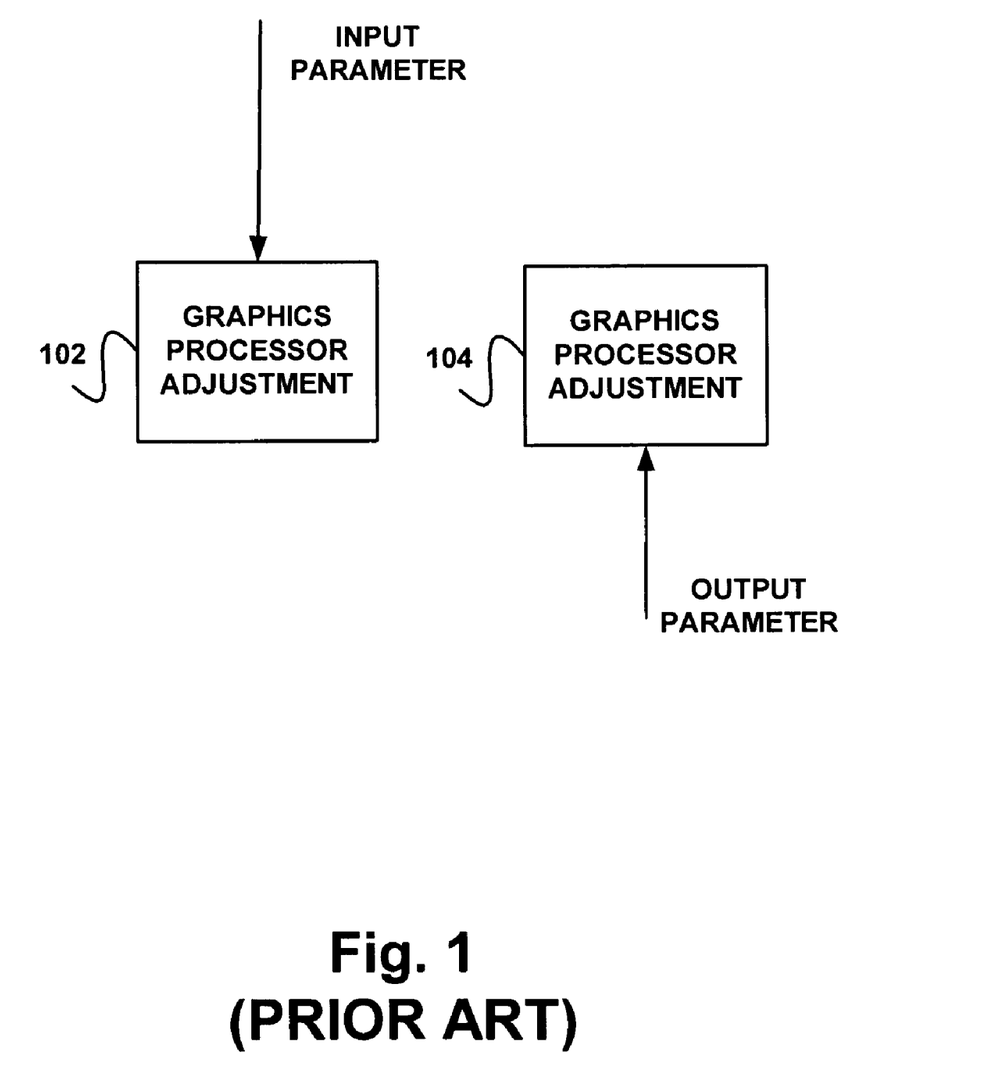
FIG. 1 illustrates graphics processor adjustments, in accordance with the prior art.

Unfortunately, adjustments to graphics processors have typically been limited to the use of EDID, etc. FIG. 1 illustrates the current state of such graphics processor adjustments 102, 104, in accordance with the prior art. As shown, such graphics processor adjustments 102, 104, in general, are typically based on independent input and output parameters.

There is thus a need for overcoming these and/or other limitations associated with the prior art.

SUMMARY

A system, method, and computer program product are provided for adjusting at least one aspect of a programmable graphics and/or audio processor. In use, at least one input parameter and at least one output parameter of a programmable graphics and/or audio processor are identified. Thereafter, at least one aspect of the programmable graphics and/or audio processor may thus be dynamically adjusted. Such adjustment is performed as a function of both the at least one input parameter and the at least one output parameter.

BRIEF DESCRIPTION OF THE DRAWINGS

Prior art

DETAILED DESCRIPTION

Figure 2:
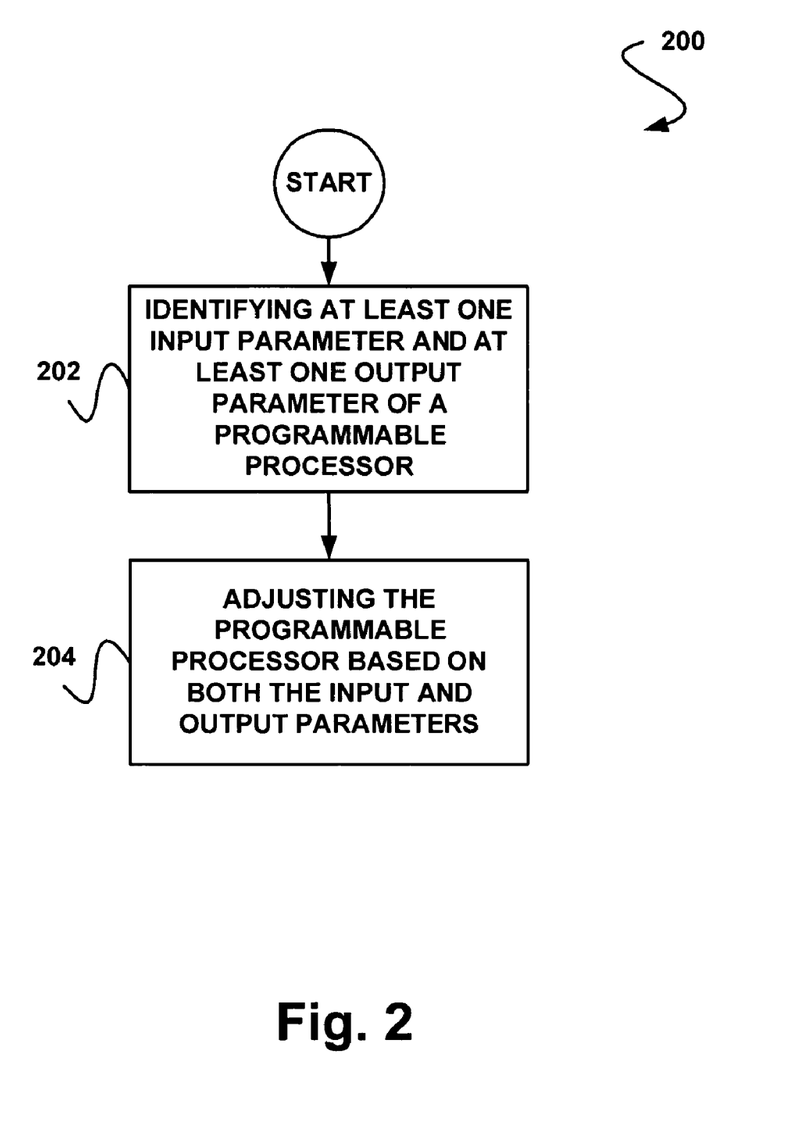
FIG. 2 shows a method for adjusting at least one aspect of a programmable graphics and/or audio processor, in accordance with one embodiment.

FIG. 2 shows a method 200 for adjusting at least one aspect of a programmable graphics and/or audio processor, in accordance with one embodiment. In the context of the present description, the programmable graphics and/or audio processor may refer to any hardware graphics and/or audio processor having at least one aspect that is capable of being adjusted.

Just by way of example, in the context of an embodiment where a graphics processor is provided, the graphics processor may include a graphics processing unit (GPU). More information regarding another exemplary programmable graphics processor and a related environment will be set forth in greater detail during reference to FIG. 6. On the other hand, in the context of an embodiment where an audio processor is provided, the audio processor may be provided in the form of an audio card, an embedded audio processor, etc.

As shown in operation 202, at least one input parameter and at least one output parameter of a programmable graphics and/or audio processor are identified. In the context of the present description, such parameters may refer to any data, code, and/or hardware associated with an input and output of the programmable graphics and/or audio processor, respectively.

Just by way of example, in the context of an embodiment where a graphics processor is provided, the input parameter may be associated with content to be processed by the programmable graphics processor, while the output parameter may be associated with a display device to be used to display the content. Of course, such examples are merely set forth for illustrative purposes only and should not be construed as limiting in any manner. Still yet, the identification of such parameters may be accomplished in any desired manner that allows for the adjustment of the programmable graphics and/or audio processor in a manner that will now be set forth.

Specifically, in operation 204, at least one aspect of the programmable graphics and/or audio processor may thus be adjusted based on the at least one input parameter and the at least one output parameter. Just by way of example, again in the context of an embodiment where a graphics processor is provided, such aspect of the graphics processor may involve at least one shader. Shaders include programs (e.g. vertex programs, pixel programs, etc.) used, in some embodiments, to determine surface properties of an object or image being rendered, and can describe light absorption, diffusion, texture mapping, reflection, refraction, shadowing, surface displacement, post-processing effects, and/or any other desired surface property for that matter. It should be further noted that the foregoing shaders may also be used for video processing, in other embodiments.

Of course, in other embodiments, the aspect of the graphics processor that is adjusted may include, but is not limited the various aspects set forth in Table 1 below. As shown, a plurality of general categories of different aspects are disclosed along with specific examples thereof, as well as illustrations as to the context in which such exemplary aspects may be adjusted.

TABLE 1

| General Categories of Aspects | Specific Examples of General Aspects, if Applicable | Illustration(s) of Adjustment to One or More Specific Example(s) |
|---|---|---|
| Video processing | Gamma table | Gamma may be adjusted based on a gamma level associated with the content and/or display |
|  | Motion estimation or compensation | Motion estimation or compensation may be adjusted for frame rate control, de-interlacing, and/or noise reduction |
|  | Color space control | Color space control may be adjusted for aspect ratio conversion, resolution matching, etc. |
|  | Look up table | Look up table may be adjusted for color or gamma correction |
|  | Misc. (e.g. overlay, scaling, encoding, etc.) |  |
| Graphics processing | Pixel processing Vertex processing Texturing | Texturing algorithm and associated quality may be adjusted based on content and capabilities of display |
| Timing | Synch generation Pixel clock tuning | Timing of graphics processor may be adjusted based on a type of display (e.g. if a display requires a predetermined refresh rate, the graphics processor timing may be adjusted to match the same to avoid unnecessary processing, etc.) |
| Level of offloading to graphics processor | Software application diagnosis | Offloading may be increased when central processing unit usage is particularly required (e.g. downloading electronic mail while watching a DVD, etc.) |

Again, such examples are set forth for illustrative purposes only and should not be construed as limiting in any manner. To this end, any aspect of the graphics processor may be adjusted in any manner to achieve pixel (video and/or graphics) manipulation, etc.

Figure 3:
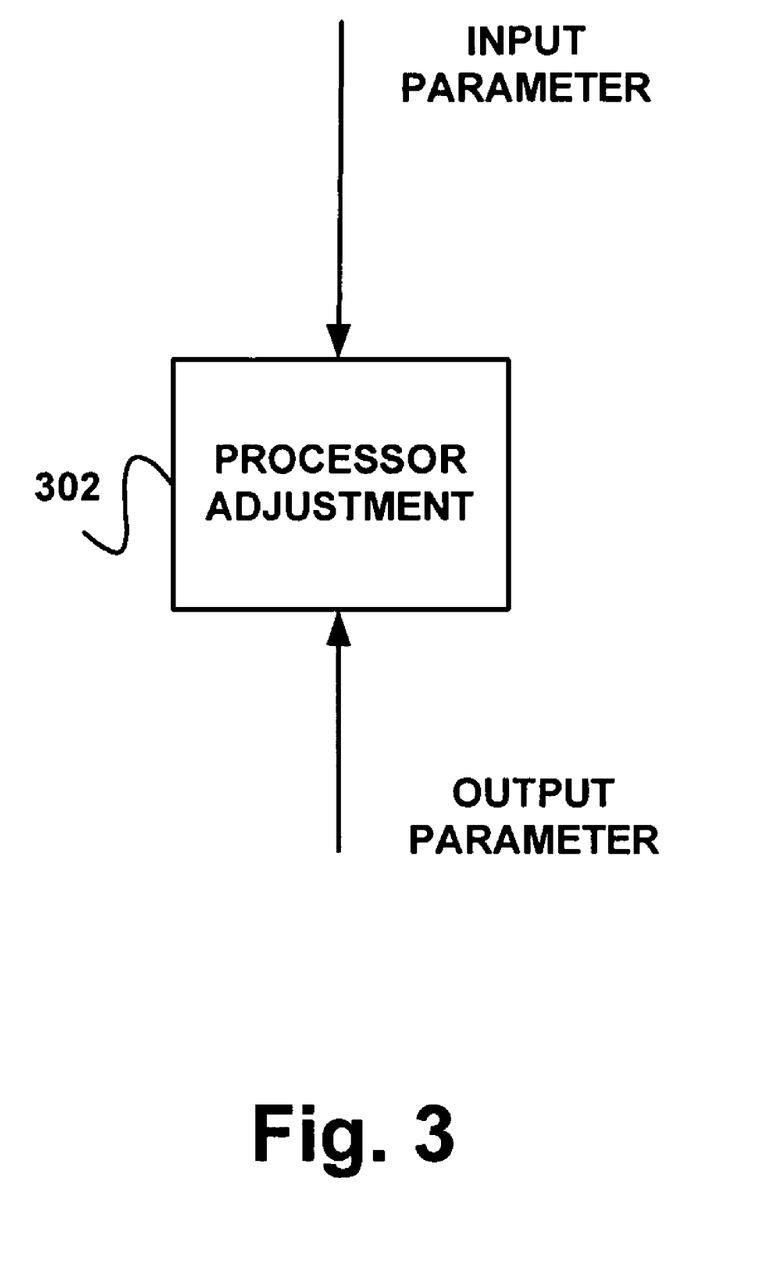
FIG. 3 illustrates a graphics and/or audio processor adjustment, in accordance with one embodiment.

It should be noted that the adjustment is performed as a function of both the at least one input parameter and the at least one output parameter. For example, in some embodiments, the adjustment (and thus the resultant processing, etc.) may be coupled to both the input and output parameters. FIG. 3 illustrates a graphics and/or audio processor adjustment 302, in accordance with one embodiment. As shown, a single graphics processor adjustment 302 may be simultaneously based on both input and output parameters.

More illustrative information will now be set forth regarding various optional architectures and features with which the foregoing framework may or may not be implemented, per the desires of the user. It should be strongly noted that the following information is set forth for illustrative purposes and should not be construed as limiting in any manner.

For example, in one optional embodiment, the foregoing adjustment may be carried out dynamically. In the context of the present description, such dynamic adjustment refers to at least two adjustments being made after start-up and/or an initial configuration. For instance, in the context of one exemplary embodiment that will be elaborated upon later, the adjustment may be carried out dynamically by updating the adjustment of the at least one aspect of the graphics processor, upon at least one of the aforementioned parameters changing.

As yet another example, the remaining embodiments will be described primarily in the context of a graphics processor. Of course, it is to be understood that any of such features may be applied in an audio processor environment, but not necessarily vice versa. Still yet, an embodiment is also contemplated where a video processor (with or without graphics processing capabilities) is provided.

To this end, any of the following features may be optionally incorporated with or without the exclusion of other features described.

Figure 4:
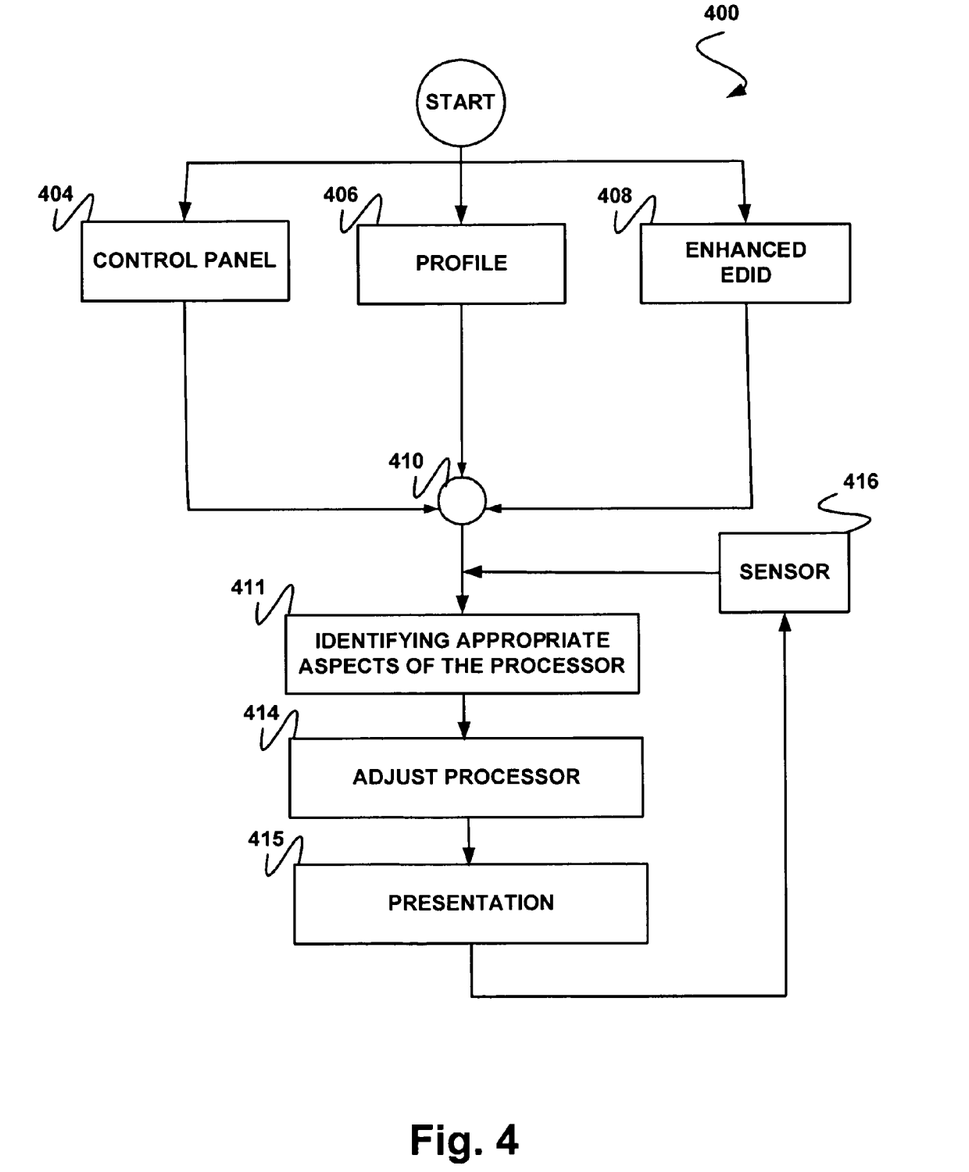
FIG. 4 shows a method for adjusting at least one aspect of a programmable graphics processor, in accordance with one embodiment.

FIG. 4 shows a method 400 for adjusting at least one aspect of a programmable graphics processor, in accordance with one embodiment. As an option, the present method 400 may be implemented in the context of the method 200 of FIG. 2. Of course, however, the method 400 may be carried out in any desired environment. Still yet, the above definitions apply during the following description.

As shown, various input/output parameters from different sources are used to adjust at least one aspect of a programmable graphics processor, in accordance with one embodiment. While specific sources of parameters are shown in FIG. 4, it should be noted that any number of sources may be provided (including or not including the sources shown).

Specifically, a profile may be identified in operation 406. As an option, the user may define their own profile or select from a plurality of pre-defined profiles. Still yet, such profiles may each relate to a specific operational characteristic (e.g. power, performance, etc.). For example, the user may request that certain graphics and/or video processing capabilities be enabled, that a particular battery life is desired, etc. Even still, instead of a user specifying particular options, a user may just simply configure a system to operate in a desired manner, after which the relevant options may be automatically identified and saved in the form of a profile.

In one possible example, a first profile may be adapted to conserve power at the cost of performance, and a second profile may be adapted to optimize performance at the cost of power. To this end, in one example of use, a user playing a DVD on a plane in a battery mode may select the first profile, since the first profile requires less power during use of the graphics processor with respect to the second profile. In another example of use, a user playing a graphics-intensive game in AC mode may select the second profile.

Still yet, parameters may be received via a control panel in operation 404. Such control panel may allow a user to specifically determine operational characteristics. In one optional embodiment, the control panel may even be capable of allowing a user to select a profile in which the graphics processor is to operate, per operation 406.

Even still, additional parameters specifically related to a display device may be collected utilizing extended display identification data (EDID) which is defined by the video electronics standards association (VESA). See operation 408. As mentioned earlier, such EDID may include vendor information, maximum image size, color characteristics, factory pre-set timings, frequency range limits, character strings for the output display name, serial number, etc.

Still yet, in one embodiment, such EDID may be enhanced, or may even be substituted with a data structure that includes additional parameters such an associated aspect ratio, indication whether the display device has a wide screen format or not, native resolution information, indication whether the display device is natively interlaced or progressive in nature, a color capability of the display device, a frequency response of the display device, an indication as to whether the display device has an interlaced format or a progressive format, etc. Of course, such examples are set forth for illustrative purposes only and should not be construed as limiting, as any parameter associated with the display (e.g. response time, pixel pitch, etc.) may be utilized. To obtain such information, a query may be made to the display device itself (and/or an associated driver, etc.).

It should be noted that further parameters may be provided by way of a sensor in operation 416. In one optional embodiment, such sensor may take the form of an external sensor that is capable of identifying an amount of light in an environment surrounding a particular system. Of course, any external parameter (e.g. ambient noise, presence of AC power, movement, etc.) may be sensed by the sensor for providing related parameters. Still yet, one or more sensors may be employed for sensing various parameters including, but not limited to edges that may be detected, scan structure, color space, aspect ratio, contrast ratio, etc.

To this end, input/output parameters from operations 404, 406, 408 and/or 416 may be fed to logic 410 which, in turn, is capable of using the same to identify relevant adjustable aspects of the graphics processor. See operation 411. For example, regarding power-related parameters, aspects of the graphics processor that impact power (i.e. require additional power, etc.) may be identified for adjustment purposes. Similarly, regarding performance-related parameters, aspects of the graphics processor that impact performance may be identified for adjustment purposes.

In still other embodiments, the input parameters and the output parameters may be reviewed to determine whether any such parameters may potentially lead to conflicting adjustments to the graphics processor. For example, a user profile may call for resource-intensive advanced graphics and/or video processing while a control panel selection may require a certain amount of power savings. In such situations, a priority-level or the like assigned to each of the input parameters received in operations 404, 406, 408 and/or 416 (or any other rule-based logic, for that matter) may be used to adjust the graphics processor appropriately.

Given such input/output parameters, the graphics processor may be adjusted in operation 414, such that content may be processed and presented in operation 415. Since, during use, the aforementioned external parameter may change, information from the sensor may be feed back to the logic 410, in the manner shown in FIG. 4. Thus, the logic 410 may automatically update the appropriate parameters and adjustment of the graphics processor in operations 411 and 414 (with or without user intervention), for optimizing the presentation in operation 415, in view of any changes in the environment.

It should be noted that the various aforementioned operations may be carried out by any software and/or hardware associated with the graphics processor, a central processing unit, dedicated circuitry, and/or any other desired logic. More information will now be set forth regarding one illustrative algorithm that may be carried out in the context of the above method.

Figure 5:
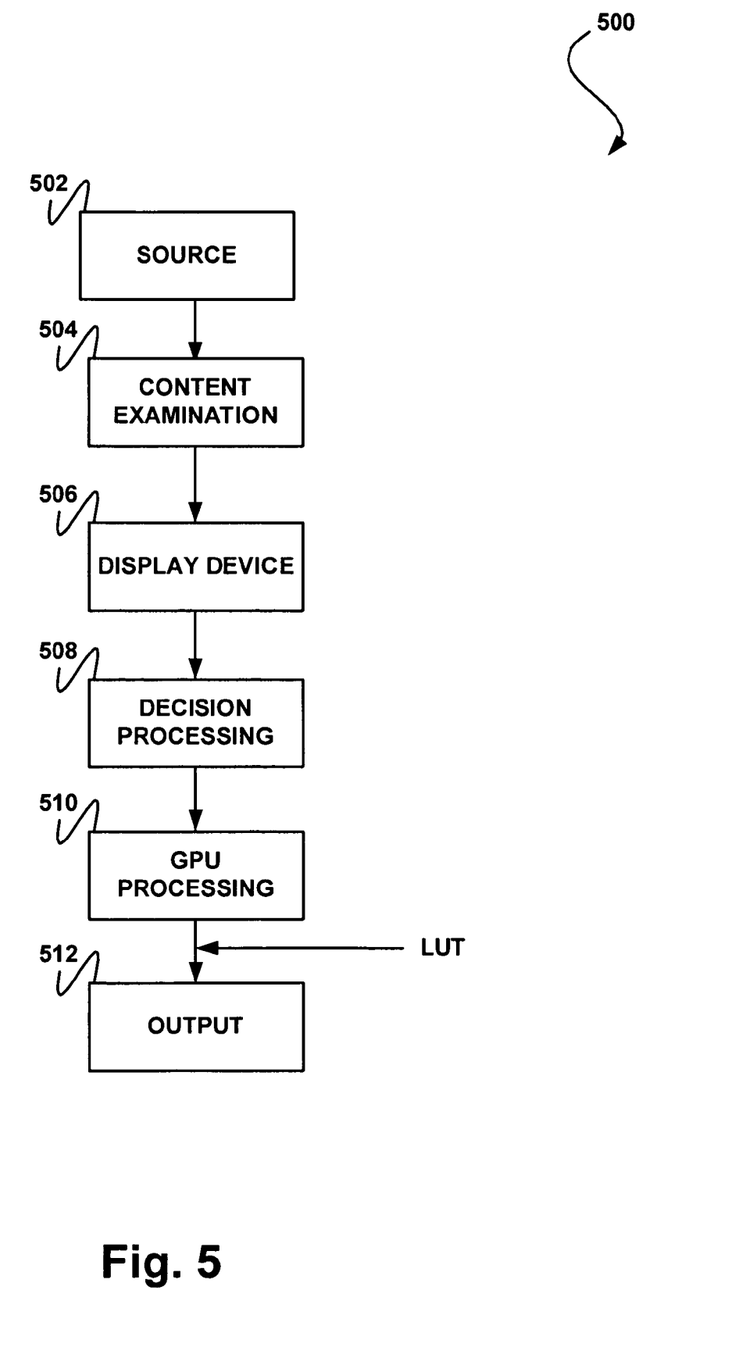
FIG. 5 shows a method for adjusting at least one aspect of a programmable graphics processor, in accordance with another embodiment.

FIG. 5 shows a method 500 for adjusting at least one aspect of a programmable graphics processor, in accordance with another embodiment. As an option, the present method 500 may be implemented in the context of the methods of FIGS. 2-4. Of course, however, the method 500 may be carried out in any desired environment. While a particular order of the various operations is shown below, it should be noted that any other order (or even parallel operations) may be employed.

As shown, content to be processed by the programmable graphics processor is received from a source in operation 502. Such content is then examined in operation 504 for the purpose of identifying at least one input parameter that is associated with the content. Such input parameters(s) may be identified in any desired manner (e.g. heuristics, etc.). In one embodiment, such input parameter may include, but is not limited to a size of the content, an indication as to whether the content has an analog format or a digital format, an indication as to whether the content has an interlaced format or a progressive format, an indication as to whether the content exhibits noise, etc. Of course, any other parameter associated with the content may be identified such as whether the content is video or film originated; determination of softness, any ringing, cross color associated with the content; etc.

Next, a display device is inspected for identifying at least one output parameter associated therewith. See operation 506. Of course, any of the aforementioned output parameters may be identified. Further, this output parameter(s) may be identified utilizing the EDID, as mentioned hereinabove.

Thereafter, in operation 508, the input and output parameters are mapped to determine the appropriate manner in which the graphics processor is to be adjusted. To this end, the adjusted graphics processor may process the content via the display in a way that may be optimized in view of both the associated input and output parameters. See operations 510-512. As an option, the adjustment determined in operation 508 may be stored in a look up table (possibly as a profile) for the purpose of being re-used at a later time (e.g. particularly when the same content is displayed on the same display device, etc.).

Thus, the present technique may be used in various situations to tailor graphics (as well as video) processing based on input/output parameters. In one example, a user may be utilizing a laptop to watch a movie on a plane. This scenario may imply that the user is watching the movie on a relatively small computer liquid crystal display (LCD) device. Consequently, the required video processing may be far less than necessary when playing content back on a large high definition display, for example. Thus, high quality processing and memory intensive computations may not necessarily be required. In another example, advanced de-interlacing may not be necessary when a more basic de-interlacing process would suffice with minimal compromise of video quality, but with a benefit of less power utilized by the graphics processor.

Figure 6:
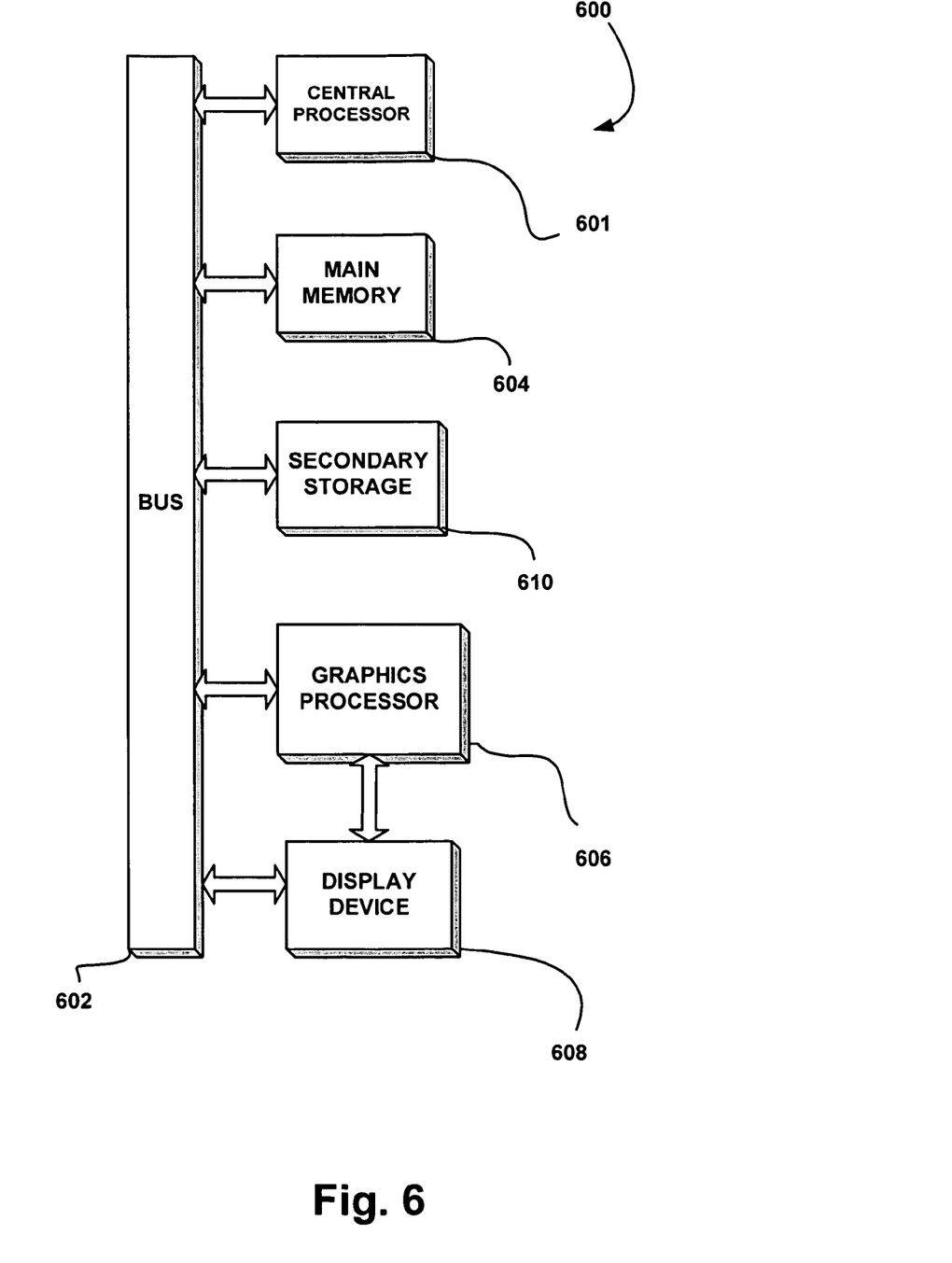
FIG. 6 illustrates an exemplary computer system in which the various architecture and/or functionality of the various previous embodiments may be implemented.

FIG. 6 illustrates an exemplary computer system 600 in which the various architecture and/or functionality of the various previous embodiments may be implemented. As shown, a computer system 600 is provided including at least one host processor 601 which is connected to a communication bus 602. The computer system 600 also includes a main memory 604. Control logic (software) and data are stored in the main memory 604 which may take the form of random access memory (RAM).

The computer system 600 also includes a graphics processor 606 and a display device 608, i.e. a computer monitor. In one embodiment, the graphics processor 606 may include a plurality of shader modules, a rasterization module, a video processing module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The computer system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the computer system 600 to perform various functions. Memory 604, storage 610 and/or any other storage are possible examples of computer-readable media.

In one embodiment, the architecture and/or functionality of the various previous figures may be implemented in the context of the host processor 601, graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for adjusting a programmable graphics and/or audio processor based on input and output parameters, comprising:

identifying at least one input parameter and at least one output parameter of a programmable graphics and/or audio processor, the at least one input parameter including one or more properties of a content to be processed by the programmable graphics and/or audio processor;

assigning a priority-level to each of the at least one input parameter and each of the at least one output parameter;

determining whether any of the at least one input parameter or the at least one output parameter indicate a first adjustment to the programmable graphics and/or audio processor which conflicts with a second adjustment to the programmable graphics and/or audio processor indicated by any other of the at least one input parameter or the at least one output parameter;

in response to a determination that any of the at least one input parameter or the at least one output parameter indicate the first adjustment to the programmable graphics and/or audio processor which conflicts with the second adjustment to the programmable graphics and/or audio processor indicated by any other of the at least one input parameter or the at least one output parameter, selecting from at least one of the at least one input arameter and the at least one output parameter based on the priority-level for avoiding the conflict;

in response to a determination that none of the at least one input parameter or the at least one output parameter indicate the first adjustment to the programmable graphics and/or audio processor which conflicts with the second adjustment to the programmable graphics and/or audio processor indicated by any other of the at least one input parameter or the at least one output parameter, selecting each of the at least one input parameter and each of the at least one output parameter;

mapping the selected at least one input parameter and the selected at least one output parameter;

determining a manner in which the programmable graphics and/or audio processor is to be adjusted for optimizing the processing of the content in view of the selected at least one input parameter and the selected at least one output parameter, the determination of the manner of the adjustment based on the mapping of the selected at least one input parameter and the selected at least one output parameter; and dynamically adjusting at least one aspect of the programmable graphics and/or audio processor in the determined manner, such that the adjustment is performed as a function of both the selected at least one input parameter and the selected at least one output parameter.

2. The method as recited in claim 1, wherein the programmable graphics and/or audio processor includes a graphics processor.

3. The method as recited in claim 2, wherein the at least one output parameter is associated with a display device.

4. The method as recited in claim 3, wherein the at least one output parameter includes at least one of a resolution of the display device, a color capability of the display device, a frequency response of the display device, and an indication as to whether the display device has an interlaced format or a progressive format.

5. The method as recited in claim 3, wherein the at least one output parameter is identified utilizing extended display identification data.

6. The method as recited in claim 2, wherein the at least one output parameter is identified utilizing an external sensor.

7. The method as recited in claim 2, wherein at least one of the at least one output parameter and the at least one input parameter is identified utilizing a control panel.

8. The method as recited in claim 2, wherein at least one of the at least one output parameter and the at least one input parameter is identified based on a profile.

9. The method as recited in claim 8, wherein the profile is user-defined.

10. The method as recited in claim 8, wherein the profile is selected from a plurality of profiles by a user.

11. The method as recited in claim 8, wherein a first profile requires less power during use of the graphics processor with respect to a second profile.

12. The method as recited in claim 8, wherein the at least one of the at least one output parameter and the at least one input parameter identified based on a profile indicates the first adjustment, where the first adjustment calls for resource-intensive processing, and the second adjustment is indicated by a control panel selection, and it is determined that the first adjustment indicated by the profile conflicts with the second adjustment indicated by the control panel selection.

13. The method as recited in claim 2, wherein the at least one aspect of the graphics processor that is adjusted involves at least one of a shader and a video processing module.

14. The method as recited in claim 2, wherein the at least one aspect of the graphics processor that is adjusted includes at least one of a timing of the graphics processor, video processing of the graphics processor, and graphics processing of the graphics processor.

15. The method as recited in claim 1, wherein the at least one input parameter includes at least one of a size of the content, an indication as to whether the content has an analog format or a digital format, an indication as to whether the content has an interlaced format or a progressive format, and an indication as to whether the content exhibits noise.

16. The method as recited in claim 1, wherein the adjustment is stored as a profile for later use.

17. The method as recited in claim 1, wherein the adjustment is dynamic by updating the at least one aspect of the graphics processor upon at least one of the parameters changing.

18. The method as recited in claim 1, wherein the adjustment is stored in a look-up table as a profile.

19. The method as recited in claim 1, wherein the at least one input parameter includes an indication as to whether the content is video or film originated.

20. The method as recited in claim 1, wherein the at least one input parameter includes a softness associated with the content.

21. The method as recited in claim 1, wherein the at least one input parameter includes an indication of cross color associated with the content.

22. The method as recited in claim 1, wherein the adjustment includes performing the function simultaneously based on both of the selected at least one input parameter and the selected at least one output parameter.

23. A computer program product embodied on a non-transitory computer readable medium for adjusting a programmable processor capable of audio, graphics or video processing based on input and output parameters, comprising:
    computer code for identifying at least one input parameter and at least one output parameter of a programmable processor capable of audio, graphics or video processing; the at least one input parameter including one or more properties of a content to be processed by the programmable processor;
    computer code for assigning a priority-level to each of the at least one input parameter and each of the at least one output parameter;
    computer code for determining whether any of the at least one input parameter or the at least one output parameter indicate a first adjustment to the programmable processor which conflicts with a second adjustment to the programmable processor indicated by any other of the at least one input parameter or the at least one output parameter;
    computer code for, in response to a determination that any of the at least one input parameter or the at least one output parameter indicate the first adjustment to the programmable processor which conflicts with the second adjustment to the programmable processor indicated by any other of the at least one input parameter or the at least one output parameter, selecting from at least one of the at least one input parameter and the at least one output parameter based on the priority-level for avoiding the conflict;
    computer code for, in response to a determination that none of the at least one input parameter or the at least one output parameter indicate the first adjustment to the programmable processor which conflicts with the second adjustment to the programmable processor indicated by any other of the at least one input parameter or the at least one output parameter, selecting each of the at least one input parameter and each of the at least one output parameter;
    computer code for mapping the selected at least one input parameter and the selected at least one output parameter;
    computer code for determining a manner in which the programmable processor is to be adjusted for optimizing the processing of the content in view of the selected at least one input parameter and the selected at least one output parameter, the determination of the manner of the adjustment based on the mapping of the selected at least one input parameter and the selected at least one output parameter; and
    computer code for dynamically adjusting at least one aspect of the programmable processor in the determined manner, such that the adjustment is performed as a function of both the selected at least one input parameter and the selected at least one output parameter.

24. A system for adjusting a programmable processor capable of graphics or video processing based on input and output parameters, comprising:
    a tangible programmable processor capable of graphics or video processing, and being adjusted in a determined manner such that the adjustment is performed as a function of both a selection of at least one input parameter and a selection of at least one output parameter of the processor, the at least one input parameter including one or more properties of a content to be processed by the tangible programmable processor;
    wherein the system is operable to identify the at least one input parameter and the at least one output parameter of the tangible programmable processor;
    wherein the system is operable such that a priority-level is assigned to each of the at least one input parameter and each of the at least one output parameter;
    wherein the system is operable to determine whether any of the at least one input parameter or the at least one output parameter indicate a first adjustment to the tangible programmable processor which conflicts with a second adjustment to the tangible programmable processor indicated by any other of the at least one input parameter or the at least one output parameter;
    wherein the system is operable to, in response to a determination that any of the at least one input parameter or the at least one output parameter indicate the first adjustment to the tangible programmable processor which conflicts with the second adjustment to the tangible programmable processor indicated by any other of the at least one input parameter or the at least one output parameter, select from at least one of the at least one input parameter and the at least one output parameter based on the priority-level for avoiding the conflict;
    wherein the system is operable to, in response to a determination that none of the at least one input parameter or the at least one output parameter indicate the first adjustment to the tangible programmable processor which conflicts with the second adjustment to the tangible programmable processor indicated by any other of the at least one input parameter or the at least one output parameter, select each of the at least one input parameter and each of the at least one output parameter;
    wherein the system is operable such that the selected at least one input parameter and the selected at least one output parameter are mapped;
    wherein the system is operable to determine the manner in which the tangible programmable processor is adjusted for optimizing the processing of the content in view of the selected at least one input parameter and the selected at least one output parameter, the determination of the manner of the adjustment based on the mapping of the selected at least one input parameter and the selected at least one output parameter.

25. The system as recited in claim 24, wherein the processor is in communication with a central processing unit via a bus.

* * * * *